United States Patent [19]
Reudink

[11] 3,798,547
[45] Mar. 19, 1974

[54] APPROXIMATE COPHASING FOR DIVERSITY RECEIVERS

[75] Inventor: Douglas Otto John Reudink, Colts Neck, N.J.

[73] Assignee: Bell Telephone Laboratories, Incorporated, Murray Hill, N.J.

[22] Filed: Dec. 29, 1972

[21] Appl. No.: 319,552

[52] U.S. Cl. .................. 325/305, 325/307, 325/323, 325/351, 325/369, 325/372, 325/476
[51] Int. Cl. .................. H04b 1/06
[58] Field of Search .................. 325/301–307, 325/323–326, 351, 369, 371, 372, 475, 476, 56

[56] References Cited

UNITED STATES PATENTS 2,975,275 3/1961 Adams .................. 325/305

*Primary Examiner*—Albert J. Mayer
*Attorney, Agent, or Firm*—D. L. Hurewitz

[57] ABSTRACT

In a predetection combining diversity receiver approximate cophasing of the individual receptions is temporarily achieved by frequency division of the received signals. These signals, which contain independent phase angles so that any two may be randomly out-of-phase, are each applied to identical frequency division circuits. By dividing each carrier frequency by the factor, N, common to all of the dividing circuits, all of the signals will be initially phased within ± π/N radians. In time, the effect of random phase variations may cause the approximately cophased signals to drift apart. Therefore, the frequency dividing circuits are periodically reset to reestablish approximate cophasing.

8 Claims, 5 Drawing Figures

APPROXIMATE COPHASING FOR DIVERSITY RECEIVERS

BACKGROUND OF THE INVENTION

This invention relates to diversity radio receivers, and more particularly to circuitry for approximately cophasing the signals received by a space diversity antenna array.

The value of diversity in reducing fading in mobile radio systems is well established. In predetection combining receivers, each branch of the receiver is responsive to a separate signal containing a random phase variation due to the multipath environment. Cophasing of the diversely received signals is essential to a useful combination, and numerous cophasing techniques are known. One method employs a variable phase-shifter to continuously adjust the phase of one or more of the received signals to produce the cophased condition. Continuous phase-shifting can also be provided by insertion of appropriate delays. An alternative continuous cophasing receiver, referred to as a Granlund, uses a mix-on-self loop to modify a received signal in a manner which eliminates the random phase variations.

These continuous techniques produce a theoretically exact cophasing, but they require adjustable circuitry responsive to feedback from sensors monitoring either the combined output or the individual signals being combined. Receivers of this kind are therefore complex and costly.

If approximate cophasing is sufficient, a number of fixed value phase shifters or fixed duration delay lines can be arranged in a network which is reconfigured as the conditions of the input signals vary. Reconfiguring this network in response to these changes is, however, also complex and costly and is advantageous only in a limited number of situations.

For certain uses, such as mobile radio telephone, where large numbers of mobile stations are desired, very simple, reliable and inexpensive cophasing arrangements are required if the system is to be economically feasible.

SUMMARY OF THE INVENTION

In accordance with the present invention approximate predetection cophasing is achieved in a simple and economical manner suitable for use in mobile radio telephone units. Each element of a space diversity antenna array receives a branch signal randomly phased relative to the others, but containing the same intelligence modulation. All of the signals are frequency divided by a common fixed divisor N so that the maximum phase difference between two divided signals is $\pm \pi/N$ radians for a difference of $\pm \pi$ radians between two received signals. Selection of the fixed divisor N permits the degree of approximate cophasing to be chosen to meet the requirements of any specific system. The approximately cophased branch signals can be combined in a linear network, and the combined output may be demodulated in a conventional manner.

Variation of the random phase between receptions will cause the cophasing to deteriorate in time and the dividers must therefore be periodically resynchronized. This may be accomplished by a reset mechanism and the rate of reset can be chosen to satisfy the characteristic of the particular system.

The circuitry is implementable by large scale integration techniques; it is therefore reliable and its cost is relatively low. In addition, the circuit can be modified to provide amplitude weighting of the received signals to achieve improved combiner output.

DETAILED DESCRIPTION

Figure 1:
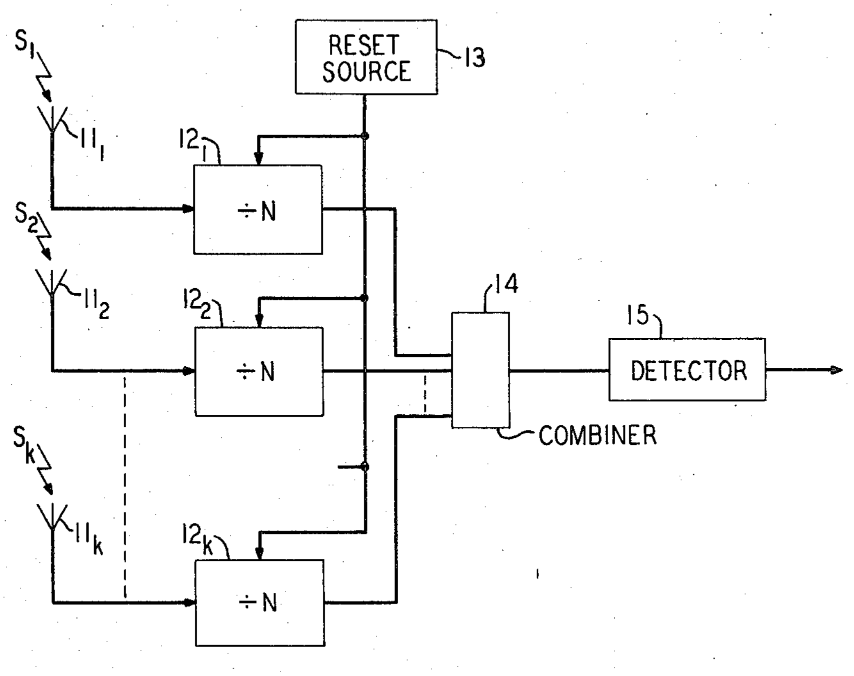
FIG. 1 is a block diagram illustrating a generalized version of the present invention.

FIG. 1 illustrates a generalized version of the invention. It shows a plurality of branch signals designated $S_1, S_2 \ldots S_k$ received respectively by antennas $11_1$, $11_2$ . . . $11_k$ of a space diversity array. All signals S carry the same intelligence modulation but have random phase angles due to the multipath environment through which they were transmitted; furthermore, these relative phases change in time. A cophasing technique is used so that when the branch signals $S_1$ through $S_k$ are added in the combiner 14, the combined output will be enhanced relative to any individual branch signal.

Frequency dividing circuits 12 are inserted in each branch between a receiving antenna 11 and combiner 14, the receptions of antennas $11_1$, $11_2$ . . . $11_k$ being applied respectively to circuits $12_1$, $12_2$ . . . $12_k$ which are identical divide by N devices. All dividing circuits 12 are synchronized to begin a division cycle at the same time and each signal S, which may vary randomly in phase, is divided by N so that the divided signals are separated in relative phase by a maximum of $\pm \pi/N$ radians. This cophasing arrangement is, of course, not sensitive to absolute phase differences greater than $\pi$ radians between received signals, but for most types of modulation this insensitivity would have no effect on the demodulated output.

The value N is fixed for all dividers in a receiver, but may be chosen to produce any desired degree of cophasing. For application in mobile radio telephone stations, it is anticipated that an N of 8 will provide sufficient approximate cophasing ($\pm \pi/8$) so that the signals may be linearly summed by combiner 14 to produce an adequate signal which may be demodulated by detector 15.

In time, noise or random phase variations may cause the relative phase among these approximately cophased signals to exceed $\pm \pi/N$ radians. Thus, periodically a reset signal from reset source 13 is applied to the divider circuits 12 to resynchronize the division cycles of the circuits and return to the condition where maximum phase separation is $\pm \pi/N$ radians.

Frequency divider circuits 12 may be analog or digital devices, many of which are known and available. Numerous analog divider circuits can be used as, for example, a circuit which produces an output by mixing an input signal with a multiplied feedback signal from the output. The divisor can be altered by changing the multiplier in the feedback path and these divider circuits can also be cascaded in series to achieve higher devisors. Digital frequency divider circuits may be, for instance, cascaded flip-flops or binary counters such as Fairchild's integrated circuit IC 998979.

Figure 2:
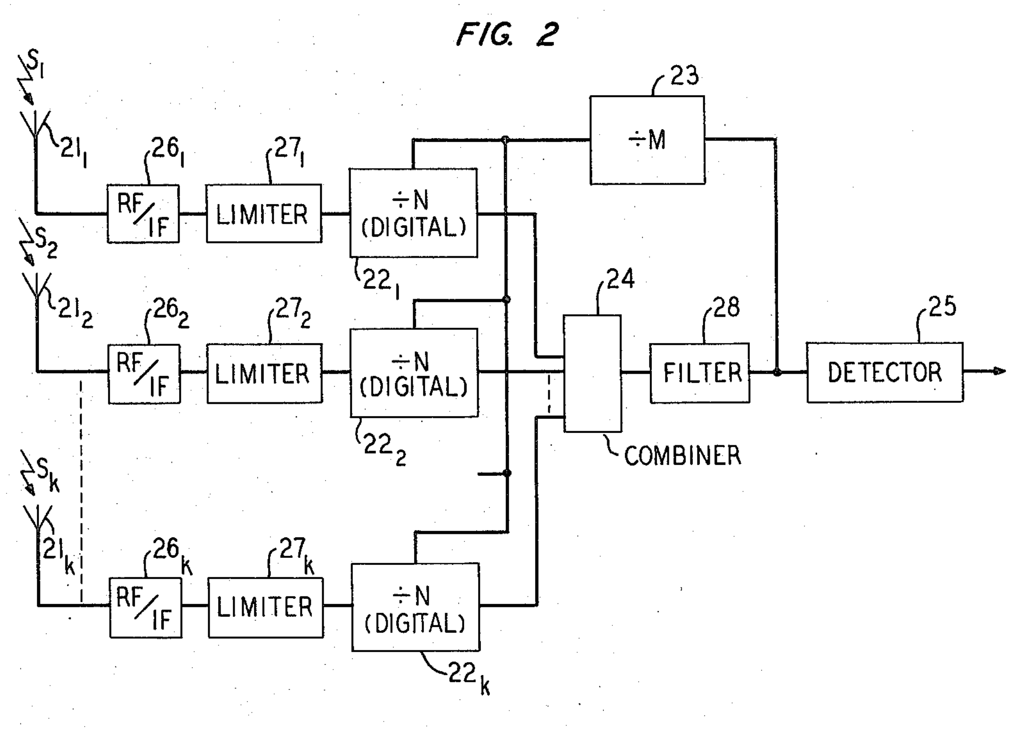
FIG. 2 is a block diagram of one embodiment in accordance with the present invention.

FIG. 2 illustrates an embodiment of the invention applicable to FM transmission systems. Frequency modulated RF signals are received by antennas $21_1$ through $21_k$ and converted to IF by respective converters $26_1$ through $26_k$. The IF branch signals are applied to respective limiters $27_1$ through $27_k$ to produce inputs appropriate to dividers $22_1$ through $22_k$, which are preferably of the digital type so that the entire branch circuitry can be fabricated by large scale integration techniques. The outputs of the dividers are linearly summed by combiner 24, and the combined output is filtered by bandpass filter 28 and applied to detector 25 which removes the frequency modulation in a conventional manner.

Figure 3:
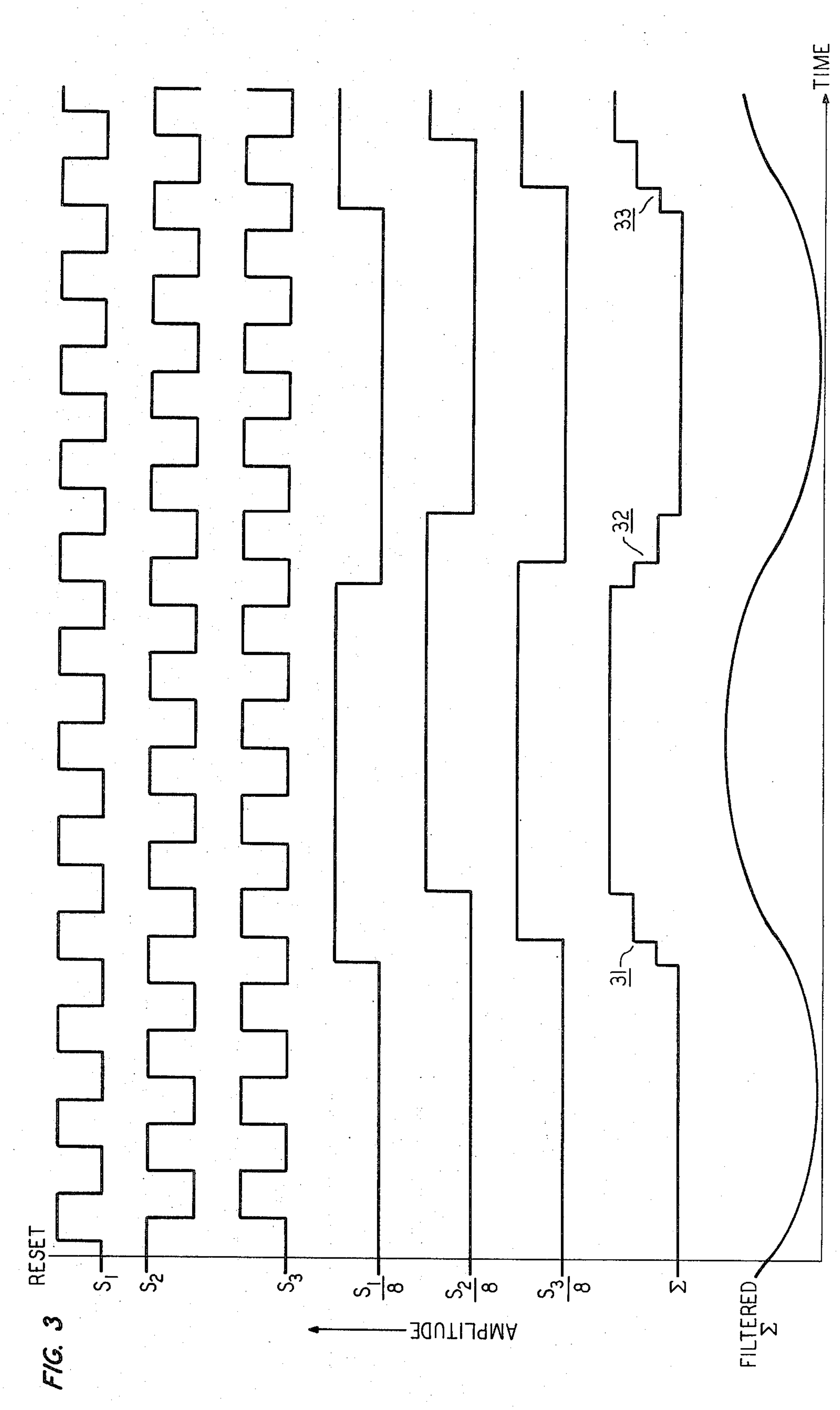
FIG. 3 is a graphical presentation of various signals exemplary of those in the system of FIG. 2, and FIGS. 4 and 5 each illustrate signal weighting circuits adaptable to the branch circuits of systems in accordance with the present invention.

In order to more clearly explain the cophasing operation of the dividing circuits amplitude versus time waveforms of an exemplary system having three diversity branches ($k = 3$) and dividing circuits where $N = 8$ is illustrated in FIG. 3. Signals $S_1$, $S_2$ and $S_3$, which are appropriately limited IF versions of the antenna receptions, are shown as square waves and while appropriate modulation is present on the received signals, frequency modulation at audio rates would not significantly alter the graphical presentation since the frequency deviations are conventionally small relative to the carrier frequency. Signals $S_1$, $S_2$ and $S_3$ are randomly phased but at reset each divider 22 simultaneously begins counting and produces an output having a change of state after each N/2 cycles of its input signal. Since $N = 8$, the frequency divided signal derived from $S_1$ is designated $S_1/8$ and as can be seen from the graph, the relative phase relations of the frequency divided signals have been reduced by 8 simply by reducing their frequencies. The maximum relative phase difference between any two of the signals $S_1/8$, $S_2/8$ or $S_3/8$ is $\pm \pi/8$ radians, and they are therefore approximately cophased since the phase separation among them is small relative to the separation among the received signals. The modulation is essentially unaffected except for a reduction in index but the approximately cophased signals are linearly summed by combiner 24 to produce the combined output $\Sigma$, which can be filtered to restore the quality of the modulation lost by the reduction of the index.

Though $\Sigma$ does not exhibit a single true step transition each half-cycle, the approximate steps illustrated at 31, 32 and 33 produce an output which, due to the approximate cophasing achieved by the frequency division, is a substantial improvement over the direct combination of signals $S_1$, $S_2$ and $S_3$, or any of them individually. Cophasing may, of course, be improved and hence the steps in $\Sigma$ made more nearly vertical by increasing the value of N.

It must be noted that this approximate cophasing is temporary since the relative phase relations between the received signals vary and as they change the phase relation between the outputs of the divider circuits will change. When this cophasing is lost, the dividers must be resynchronized so that each starts to divide simultaneously. Accordingly, a common reset signal is applied recurrently to each divider circuit 22 to simultaneously restart the dividing process in each circuit. This reset signal may be provided by an independent clock; it is advantageous, however, for the reset rate to be a factor of the carrier frequency and the reset signal may therefore be conveniently produced as shown in FIG. 2 by divider circuit 23 which generates an output at a frequency $f$/M, where $f$ is the frequency of the combined output and M is an integral number. The size of M is, of course, directly proportional to the number of synchronizing resets per unit time, and it may be chosen to suit the conditions of the system. M could also be variable and controlled for instance in response to the speed of a mobile unit so that it compensates for Doppler shift caused by the unit's movement.

Though the invention has been described in terms of FM transmission, other types of modulation such as AM or PM are equally applicable. Phase modulation would require no change in the arrangement of FIG. 2 provided that an appropriate detector were used. For amplitude modulated signals limiters 27 would have to be removed and dividers 22 would have to be analog devices.

Figure 4:
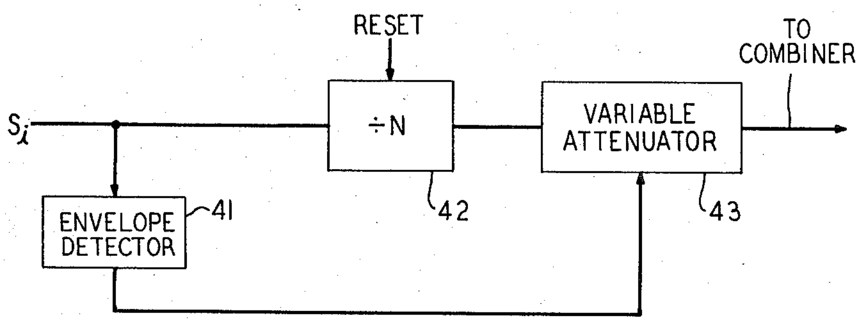

A weighting circuit, which adjusts the amplitude of a cophased signal so that it is proportional to the amplitude of the respective received signal, is illustrated in FIG. 4. It is designed to supplement the cophasing technique using digital dividers with angle (phase or frequency) modulation. In the weighting circuit which may be substituted for each divider 22 in FIG. 2, envelope detector 41 monitors the input to divider 42, which is a digital frequency divider, and controls variable attenuator 43 so that the output to the combiner is proportional to the amplitude of the input signal $S_i$.

Figure 5:
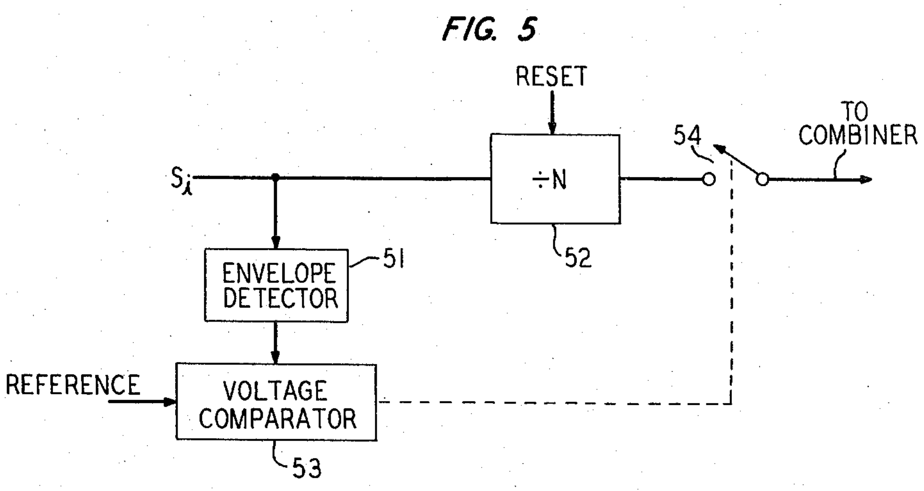

An alternative weighting circuit shown in FIG. 5 utilizes envelope detector 51 to monitor the input to divider 52, which is identical to divider 22, and comparator 53 compares the envelope voltage with a reference voltage. When the amplitude of input signal $S_i$ is less than the reference, comparator 53 opens switch 54 to prevent the branch signal from reaching the combiner. If this arrangement is contained in each branch of a receiver only strong signals will contribute to the combined output.

In all cases it is to be understood that the above-described arrangements are merely illustrative of a small number of the many possible applications of the principles of the invention. Other weighting arrangements and other circuit configurations in accordance with the present invention may be devised by those skilled in the art without departing from the spirit and scope of the invention.

What is claimed is:

1. Diversity apparatus for cophasing and combining a plurality of received signals, each signal having a phase angle randomly related to the phase angle of the others comprising:

a plurality of identical frequency dividing means for dividing the frequency and random phase of an input signal applied thereto by a fixed common factor, means for applying each of said plurality of received signals to one of said plurality of frequency dividing means, the outputs of all of said frequency dividing means being approximately cophased, means for combining the approximately cophased signals to produce a combined output, and means for periodically synchronizing the plurality of frequency dividing means.

2. Diversity apparatus as claimed in claim 1 wherein said means for periodically synchronizing the plurality of frequency dividing means includes means for generating a reset signal having a periodicity integrally related to the frequency of the combined output.

3. Diversity apparatus as claimed in claim 2 wherein said means for generating the reset signal includes means for frequency dividing the combined output by an integral divisor to produce said reset signal.

4. Diversity apparatus as claimed in claim 1 further including weighting means for controlling the amplitudes of the outputs of each of said frequency dividing means in response to the amplitude of the signal applied to the respective frequency dividing means.

5. A diversity receiver comprising:

a plurality of elements forming a space diversity antenna array for receiving a plurality of randomly phased signals containing identical frequency modulation, a plurality of identical frequency dividing means for dividing the frequency of an input signal applied thereto by a fixed common factor, means for applying each of said plurality of received signals to an exclusive one of said plurality of frequency dividing means, means for combining the outputs of said plurality of frequency dividing means to produce a combined output, means for detecting the combined output to remove the identical frequency modulation, and means for simultaneously resetting the plurality of frequency dividing means on a recurring basis, whereby the frequency divider outputs are continuously approximately cophased.

6. Diversity receiver as claimed in claim 5 wherein the fixed common factor of said frequency dividing means is N so that any two outputs of the plurality of frequency dividing means have a maximum phase difference of $\pm \pi/N$ radians.

7. A diversity receiver as claimed in claim 6 wherein said frequency dividing means is a digital device which counts the cycles of the input signal applied thereto and changes its output state recurrently upon the occurrence of each N/2 cycles, and said means for simultaneously resetting the plurality of frequency dividing means causes each of said dividing means to begin the count of input cycles at the same time.

8. A diversity receiver as claimed in claim 5 wherein said means for simultaneously resetting the plurality of frequency dividing means includes means for applying a common reset signal at nonaudio rates to each frequency dividing means, said reset signal being a frequency divided version of the combined output.

* * * * *